Figure 1:
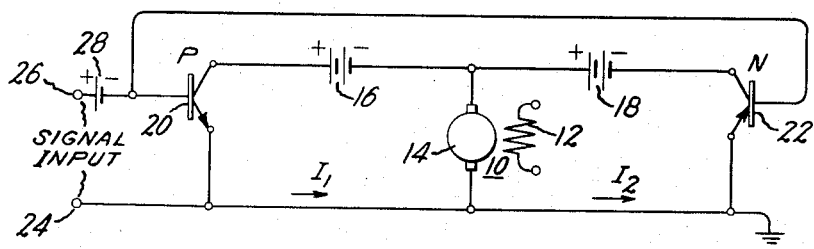

Feb. 24, 1959

J. C. BRANNAN 2,875,391

MOTOR CONTROL SYSTEM

Filed Dec. 28, 1956

Inventor:
Jack C. Brannan,
by Roe D. McBurnett
His Attorney.

United States Patent Office 2,875,391
Patented Feb. 24, 1959

2,875,391

MOTOR CONTROL SYSTEM

Jack C. Brannan, Schenectady, N. Y., assignor to General Electric Company, a corporation of New York Application December 28, 1956, Serial No. 631,301

11 Claims. (Cl. 318—293)

This invention relates to control systems for direct current electric motors and has as its principal object the provision of new and improved motor control systems wherein paired transistors having complementary operating characteristics are utilized for controlling the direction and speed of motor operation.

Control systems heretofore employed for D.-C. electric motor control, particularly in servo applications, commonly have been of vacuum tube type and therefore subject to the circuit complexity and limited current output usual in vacuum tube circuits, and subject also to the mechanical weaknesses characteristic of vacuum tubes. Moreover, these known systems suffer from the further disadvantage that they do not readily lend themselves to two-directional control of motors having separately excited fields. Motors of this type offer the advantages of linear output and relatively low inertial time constant, both of which are strongly to be desired particularly in servo applications. Because it is difficult to obtain two-directional control of such motors with these control systems, however, the more easily controlled but otherwise less satisfactory split-series motor has usually been used instead.

Systems in which thyratrons or transistors are substituted for vacuum tubes, in equivalent circuits, and systems utilizing magnetic amplifiers have also found use in motor control, but these systems are sensitive to motor back E. M. F. and also share certain of the vacuum tube system disadvantages just explained, particularly the inability to satisfactorily control separately excited field motors in both directions of rotation thereof.

In accordance with the invention, complementary transistors having operating characteristics of like form but unlike sign are paired to form novel control systems of ultimate simplicity yet free of the foregoing and other disadvantages of prior motor control systems. It is accordingly an object of the invention to provide motor control systems incorporating paired complementary transistors in a manner to afford optimum simplicity and economy of construction, and maximum reliability in service. Another object of the invention is the provision of an electric motor control system for a separately excited field motor affording two-directional continuous linear control of speed thereof, and further affording either reduced inertial time constant or reduced sensitivity to motor back E. M. F.

In carrying out the invention in its preferred form, complementary transistors having operating characteristics of like form but opposite sign have corresponding electrodes connected in parallel to a control signal input and other corresponding electrodes connected to form parallel output circuits across which is connected a D.-C. electric motor preferably of separately excited field type. On application of an input signal, a current will flow in one of the two transistor output circuits to energize the motor in a direction and at a speed dependent respectively on the polarity and magnitude of the input signal, current flow in the other transistor circuit being reduced or cut off by reason of the fact its operating characteristics are of opposite sign.

Figure 2:
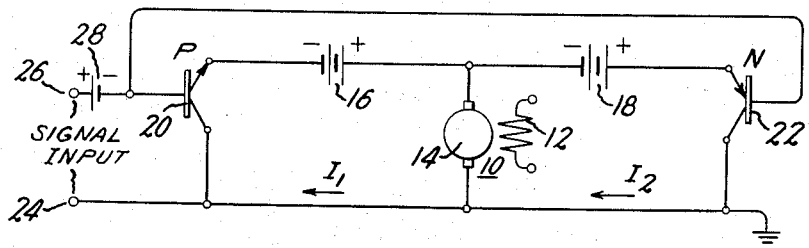
Figure 3:
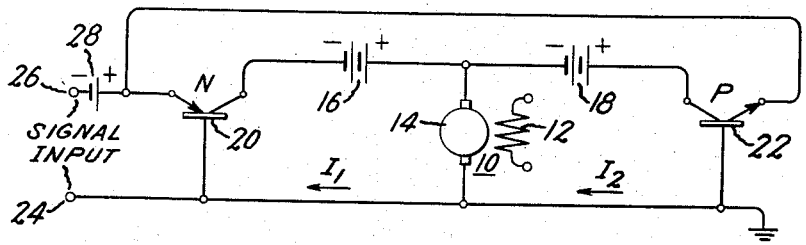

My invention will be more fully understood and its various objects, features and advantages further appreciated by reference to the appended claims and the following detailed description when read in conjunction with the accompanying drawings, wherein:

Figure 1 is a circuit diagram of one example of motor control systems in accordance with the invention; and Figures 2 and 3 are circuit diagrams of modified forms of motor control circuits further exemplifying the invention.

With continued reference to the drawings, wherein like reference numerals have been used throughout to designate like elements, a D.-C. motor constituting the output element of an open or closed loop servo system is schematically shown at 10 in Figure 1. While this motor 10 may be of any conventional type including those having series, shunt and compound wound fields, it preferably is of a type having a separately excited field since such motors offer the advantages of linear output and reduced inertial time constant as hereinafter explained. The separately excited field may be of permanent magnet type or as shown it may include a field winding 12 supplied with exciting current independently of the motor armature 14.

Connected to one side of motor 10 are two D.-C. power sources 16 and 18 arranged in the polarity relation shown. These D.-C. power sources may be batteries or any other suitable source of unidirectional current at a voltage level appropriate to the motor 10. Each of the D.-C. power sources 16 and 18 is connected in series relation with one electrode of one of a pair of transistors 20 and 22, each of which has another of its electrodes connected to the other side of motor 10 to thus form a pair of parallel output circuits each including the motor armature 14, one of the D.-C. power sources 16 and 18, and two electrodes of one of the transistors 20 or 22. The two output circuits conveniently may have a common ground as shown.

The control signal input may be from any signal source providing a D.-C. control signal of varying magnitude and polarity, and is connected into the motor control system through terminal means 24 and 26. As shown, terminal 24 is grounded and the other terminal 26 is connected through a small D.-C. biasing voltage source 28 to the remaining electrode of each of the complementary transistors 20 and 22 to form a common control signal input circuit.

As noted, the transistors 20 and 22 have complementary operating characteristics and may be of junction, point-contact or other conventional type. In point-contact transistors the semiconductor body of one of the paired transistors will be of N-type and that of the other of P-type. In junction transistors, the intermediate zone of the semiconductor body will be of N-type in one transistor and of P-type in the transistor paired therewith.

The operating characteristics of transistor pairs thus constituted will be of like form but opposite in sign. That is, in the case of N-type transistors a positive signal applied to the emitter electrode tends to drive the transistor toward saturation and maximum current output, whereas in the case of a P-type transistor a positive signal applied to the emitter electrode tends to cut off current flow. P-type transistor current also is cut off when the base electrode is negative with respect to both of the other electrodes and tends toward saturation if the base is sufficiently more positive than either of the other electrodes, the converse being true in the case of N-type transistors.

In all cases the transistors 20 and 22 have their corresponding electrodes connected in parallel relation to each other, but the several electrodes may be connected into the signal input and motor output circuits in any of several ways as shown in Figures 1-3. In Figure 1, the signal input is across the base and emitter electrodes, and the collector-emitter currents then drive the motor 10.

In operation of the Figure 1 embodiment, a positive signal applied across signal input terminals 24 and 26 will in effect reduce the negative potential which is applied to the base electrodes of transistors 20 and 22 by the biasing voltage source 28. Since transistor 20 is of P-type, this reduction in negative potential at the base electrode will tend to drive the transistor towards saturation and current then will flow in the motor circuit in the direction indicated by arrow $I_1$, this current being of magnitude dependent on the magnitude of the input signal. At transistor 22, on the other hand, the reduction in negative potential at its collector electrode will tend to drive the transistor towards cut off and the current flow $I_2$ in its output circuit therefore will be of negligible magnitude as compared to $I_1$.

If the control signal is of negative sign, then the relative magnitudes of transistor currents $I_1$ and $I_2$ will be reversed, and the net current flow through the motor will be in the direction opposite to that resulting from a positive control signal.

With reference now to Figure 2, the motor control system illustrated in this figure differs from that just described in that the transistor emitter and collector connections are reversed, as are polarities of the two D.-C. voltage sources 16 and 18. Operation of this system is generally similar to that of Figure 1, but it offers the advantage of lower inertial time constant. The inertial time constant of the system varies directly with the impedance of the motor and its energizing current source; hence the lower output impedance of transistors 20 and 22 when connected as shown in Figure 2 is effective to reduce the time constant and thus improve system operation.

The higher output impedance which is characteristic of the systems of Figures 1 and 3 also is of advantage for certain applications, however, because it renders output current flow essentially independent of the motor back E. M. F. Accordingly, the system of Figure 2 generally is preferred for use in applications wherein the inertial time constant is critical, whereas the systems of Figures 1 and 3 are preferred for applications in which insensitivity to motor back E. M. F. is the critical factor. It is to be noted that even in the systems of Figures 1 and 3, the inertial time constant may usually be made to approach or better that in a conventional system using a motor of other than separately excited field type, this being so because the inertial time constant varies inversely with the square of motor field strength and field strength in a separately excited field motor normally is held at its maximum even at low motor speeds. Moreover, since field strength is substantially constant the inertial time constant is likewise substantially constant at varying motor speeds.

In Figure 3, the transistor base electrodes are connected in parallel to the motor and to one signal input terminal, with the other input terminal being connected to the emitter electrodes and with the collector electrodes connected into the output circuits including D.-C. power sources 16 and 18. Operation of this embodiment of the invention is generally similar to that in the embodiment of Figure 1.

It will be apparent from the foregoing that the motor control systems of the invention afford optimum of simplicity and economy of manufacture, and due to the inherent ruggedness of transistors as opposed to vacuum tubes as heretofore used in motor control systems, provide maximum reliability of operation. At the same time, these systems afford effective two-directional control of motors having separately excited fields and thus permit full realization of the advantages of such motors in servo systems.

While a number of specific embodiments of the invention have been shown and described in the foregoing, it will be understood that various other modifications may be made without departing from the invention. The appended claims are therefore intended to cover all such modifications as fall within the true spirit and scope of the invention.

What is claimed is:

1. In combination in a motor control system operative in response to a D.-C. control signal of varying magnitude and polarity; a D.-C. electric motor; a plurality of D.-C. power sources; first and second transistors having complementary operating characteristics of like form but opposite sign and including base, emitter and collector electrodes; means for connecting said control signal across two electrodes of said first transistor and across the corresponding two electrodes of said second transistor, and means connecting one of said two electrodes of each transistor with the remaining electrode thereof in series relation in an output circuit including said motor and one of said D.-C. power sources, whereby a control signal of one polarity is effective to increase current flow in one of said output circuits to energize said motor in one direction and a control signal of opposite polarity is effective to increase current flow in the other of said output circuits to energize said motor in the reverse direction.

2. In combination in a motor control system operative in response to a D.-C. control signal of varying magnitude and polarity; a D.-C. electric motor; a plurality of D.-C. power sources; first and second transistors having complementary operating characterisics of like form but opposite sign and including base, emitter and collector electrodes; means for connecting said control signal across the base and emitter electrodes of said first transistor and across the correponding two electrodes of said second transistor, and means connecting said emitter electrode of each transistor with the collector electrode thereof in series relation in an output circuit including said motor and one of said D.-C. power sources, whereby a control signal of one polarity is effective to increase current flow in one of said output circuits to energize said motor in one direction and a control signal of opposite polarity is effective to increase current flow in the other of said output circuits to energize said motor in the reverse direction.

3. In combination in a motor control system operative in responce to a D.-C. control signal of varying magnitude and polarity; a D.-C. electric motor; a plurality of D.-C. power sources; first and second transistors having complementary operating characteristics of like form but opposite sign and including base, emitter and collector electrodes; means for connecting said control signal across the base and collector electrodes of said first transistor and across the corresponding two electrodes of said second transistor, and means connecting said collector electrode of each transistor with the emitter electrode thereof in series relation in an output circuit including said motor and one of said D.-C. power sources, whereby a control signal of one polarity ie effective to increase current flow in one of said output circuits to energize said motor in one direction and a control signal of opposite polarity is effective to increase current flow in the other of said output circuits to energize said motor in the reverse direction.

4. In combination in a motor control system operative in response to a D.-C. control signal of varying magnitude and polarity; a D.-C. electric motor; a plurality of D.-C. power sources; first and second transistors having complementary operating characteristics of like form but opposite sign and including base, emitter and collector electrodes; means for connecting said control signal across the emitter and base electrodes of said first transistor and across the corresponding two electrodes of said second transistor, and means connecting said base electrode of each transistor with the collector electrode thereof in series relation in an output circuit including said motor and one of said D.-C. power sources, whereby a control signal of one polarity is effective to increase current flow in one of said output circuits to energize said motor in one direction and a control signal of opposite polarity is effective to increase current flow in the other of said output circuits to energize said motor in the reverse direction.

5. In combination in a motor control system operative in response to a D.-C. control signal of varying magnitude and polarity; a D.-C. electric motor; a plurality of D.-C. power sources; first and second transistors having complementary operating characteristics of like form but opposite sign and including base, emitter and collector electrodes; means for adding a biasing voltage to said control signal and connecting the signal thus modified across two electrodes of said first transistor and across the corresponding two electrodes of said second transistor, and means connecting one of said two electrodes of each transistor with the remaining electrode thereof in series relation in an output circuit including said motor and one of said D.-C. power sources, whereby a control signal of one polarity is effective to increase current flow in one of said output circuits to energize said motor in one direction and a control signal of opposite polarity is effective to increase current flow in the other of said output circuits to energize said motor in the reverse direction.

6. In combination in a motor control system operative in response to a D.-C. control signal of varying magnitude and polarity; a D.-C. electric motor having an armature and a separately excited field; a plurality of D.-C. power sources; first and second transistors having complementary operating characteristics of like form but opposite sign and including base, emitter and collector electrodes; means for connecting said control signal across two electrodes of said first transistor and across the corresponding two electrodes of said second transistor, and means connecting one of said two electrodes of each transistor with the remaining electrode thereof in series relation in an output circuit including said motor armature and one of said D.-C. power sources.

7. In combination in a motor control system operative in response to a D.-C. control signal of varying magnitude and polarity; a D.-C. electric motor having an armature and a separately excited field; a plurality of D.-C. power sources; first and second transistors having complementary operating characteristics of like form but opposite sign and including base, emitter and collector electrodes; means for connecting said control signal across the base and emitter electrodes of said first transistor and across the corresponding two electrodes of said second transistor, and means connecting said emitter electrode of each transistor with the collector electrode thereof in series relation in an output circuit including said motor armature and one of said D.-C. power sources.

8. In combination in a motor control system operative in response to a D.-C. control signal of varying magnitude and polarity; a D.-C. electric motor having an armature and a separately excited field; a plurality of D.-C. power sources; first and second transistors having complementary operating characteristics of like form but opposite sign and including base, emitter and collector electrodes; means for connecting said control signal across the base and collector electrodes of said first transistor and across the corresponding two electrodes of said second transistor, and means connecting said collector electrode of each transistor with the emitter electrode thereof in series relation in an output circuit including said motor armature and one of said D.-C. power sources.

9. In combination in a motor control system operative in response to a D.-C. control signal of varying magnitude and polarity a D.-C. electric motor having an armature and a separately excited field; a plurality of D.-C. power sources; first and second transistors having complementary operating characteristics of like form but opposite sign and including base, emitter and collector electrodes; means for connecting said control signal across the emitter and base electrodes of said first transistor and across the corresponding two electrodes of said second transistor, and means connecting said base electrode of each transistor with the collector electrode thereof in series relation in an output circuit including said motor armature and one of said D.-C. power sources.

10. A motor control system operative in response to a D.-C. control signal of varying magnitude and polarity comprising a D.-C. electric motor having armature and field circuits; a plurality of D.-C. power sources; first and second transistors having complementary operating characteristics of like form but opposite sign and including base, emitter and collector electrodes; circuit means for applying said control signal across two electrodes of said first transistor and across the corresponding two electrodes of said second transistor, and means connecting one of said two electrodes of each transistor with the remaining electrode thereof in series relation in an output circuit including one of said motor circuits and one of said D.-C. power sources, whereby a control signal of one polarity is effective to increase current flow in one of said output circuits to energize said motor in one direction and a control signal of opposite polarity is effective to increase current flow in the other of said output circuits to energize said motor in the reverse direction.

11. A motor control system for controlling the speed and direction of rotation of a D.-C. electric motor having armature and field circuits comprising a plurality of D.-C. power sources; first and second transistors having complementary operating characteristics of like form but opposite sign and including base, emitter and collector electrodes; circuit means for applying a control signal of varying magnitude and polarity across two electrodes of said first transistor and across the corresponding two electrodes of said second transistor, and means connecting one of said two electrodes of each transistor with the remaining electrode thereof in series relation in an output circuit including one of said motor circuits and one of said D.-C. power sources, whereby a control signal of one polarity is effective to increase current flow in one of said output circuits to energize said motor in one direction and a control signal of opposite polarity is effective to increase current flow in the other of said output circuits to energize said motor in the reverse direction.

References Cited in the file of this patent
UNITED STATES PATENTS

| | | |
|---|---|---|
| 1,924,458 | Ryder | Aug. 29, 1933 |
| 2,297,719 | Satterlee | Oct. 6, 1942 |
| 2,698,392 | Herman | Dec. 28, 1954 |